United States Patent [19]
Meyers

[11] 3,846,954
[45] Nov. 12, 1974

[54] SELF-STARTING PLANT MARKER AND METHODS AND APPARATUS FOR MAKING SAME

[75] Inventor: Edward F. Meyers, Oyster Bay, N.Y.

[73] Assignee: Enviro-Gro, Inc., Hauppage, N.Y.

[22] Filed: July 27, 1973

[21] Appl. No.: 383,154

Related U.S. Application Data

[63] Continuation-in-part of Ser. Nos. 256,365, May 24, 1972, abandoned, and Ser. No. 297,202, Oct. 13, 1972, abandoned.

[52] U.S. Cl............... 53/14, 53/25, 53/131, 53/237, 47/48.5, 264/154, 264/263, 264/267
[51] Int. Cl............... B65b 1/16, B65b 61/02
[58] Field of Search............. 53/3, 14, 25, 36, 131, 53/237, 239; 47/48.5, 56; 264/154, 263, 267; 425/129 R

[56] References Cited
UNITED STATES PATENTS

| | | |
|---|---|---|
| 1,831,176 | 11/1931 | Holm-Hansen............ 53/239 X |
| 2,281,927 | 5/1942 | Fischer............ 47/56 |
| 2,776,634 | 1/1957 | Morton............ 47/48.5 X |
| 3,098,320 | 7/1963 | Estkowski............ 47/56 |
| 3,098,321 | 7/1963 | Estkowski............ 47/56 |
| 3,555,730 | 1/1971 | Brink............ 425/128 X |

FOREIGN PATENTS OR APPLICATIONS 705,926  3/1954  Great Britain............ 47/48.5

Primary Examiner—Travis S. McGehee
Assistant Examiner—John Sipos
Attorney, Agent, or Firm—Mandeville and Schweitzer

[57] ABSTRACT

Disclosed herein are an automated machine for the manufacture of self-starting wooden plant markers, a new and improved method of manufacturing self-starting plant markers, and the resulting new and improved plant marker itself.

12 Claims, 3 Drawing Figures

PATENTED NOV 12 1974　　　　3,846,954
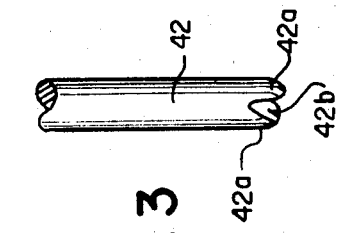
FIG. 3
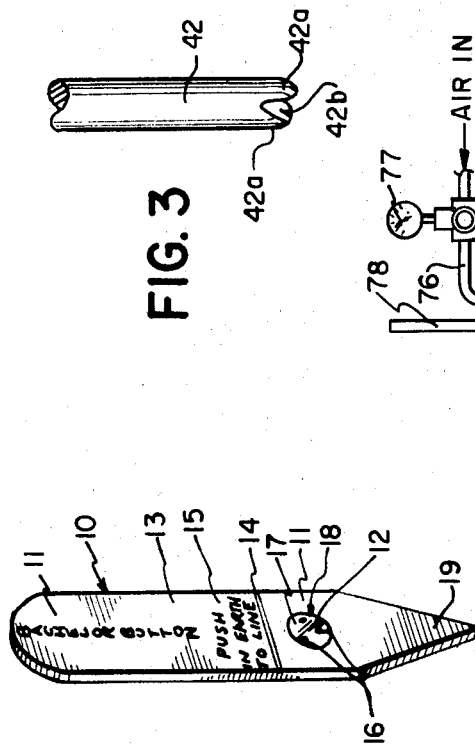
FIG. 1
FIG. 2

3,846,954

SELF-STARTING PLANT MARKER AND METHODS AND APPARATUS FOR MAKING SAME

RELATION TO COPENDING APPLICATIONS

This application is a continuation-in-part of copending applications Ser. No. 256,365, filed May 24, 1972, for "Self-Starting Plant Marker" and now abandoned and Ser. No. 297,202, filed Oct. 13, 1972, for "Method and Apparatus for Making Self-starting Plant Marker" and now abandoned.

BACKGROUND AND SUMMARY OF THE INVENTION

The apparatus of the present invention converts plain, conventional wooden plant markers of the type having a rounded or blunt upper end and a pointed lower end into seen bearing plant markers by the formation of an aperture in the lower end of the markers; the branding of the marker with appropriate seed indicia and/or planting instructions; and by the sequential or simultaneous injection into the formed aperture of seed and a fluid "wax" which are thereafter chilled together in situ to form a water soluble, solid transparent or translucent seed-carrying disc. The aforementioned steps are carried out sequentially and automatically by the apparatus of the present invention to produce a new and improved self-starting plant marker.

For a more detailed description of the present invention and its attendant advantages, reference should be made to the following description thereof taken in conjunction with the accompanying drawings.

DESCRIPTION OF THE DRAWINGS

FIG. 1 is a perspective view of a new and improved wooden plant marker embodying the principles of the present invention;

FIG. 2 is a schematic front elevational view with parts broken away to show details of construction of apparatus for automatically manufacturing plant markers of the type illustrated in FIG. 1; and FIG. 3 is a fragmentary perspective view of a punching die of the type employed in the apparatus of the present invention to form seen carrying holes in wooden markers in accordance with the principles of the present invention.

DETAILED DESCRIPTION OF THE INVENTION

Referring now to FIG. 1, the new plant marker 10 comprises a flat wooden stick or peg having grain 11 running longitudinally thereof in which stick an aperture or hole 12 is formed. Alternatively, the marker 10 may be a plastic molding, extrusion, or the like. The front surface 13 of the marker 10 carries seed identification and planting instructions 15, as well as an index line 14 indicating the depth to which the marker is to be inserted into the soil.

In accordance with the principles of one preferred embodiment of the present invention, seeds 16 are homogeneously distributed in a water soluble, wax-like vehicle 17, such as solid polyethylene glycol, to form a uniform seed-wax mixture having a predetermined concentration of seed, which mixture is injected or otherwise cast while in a molten semi-fluid, or paste-like semi-solid state into the aperture 12 for subsequent chilling. In an alternative preferred embodiment, the seed or seeds 16 is deposited in the hole 12 for subsequent encapsulation by the water soluble wax-like vehicle 17. The chilled wax-seed mixture forms a securely nested transparent or translucent plug or disc 18' which may be viewed from the front or back surfaces of the marker 10 and in which the seeds 16 may be clearly observed. As will be understood, the lower pointed end 19 of the marker 10 may be inserted into the soil to the depth indicated by the index line 14 to automatically plant at a predetermined subsurface depth, a predetermined number of seeds which, after watering, will germinate and sprout. The marker 10 will, of course, provide an identification of the species of the sprout that grows adjacent to the marker. Advantageously, a trace of water soluble nutrient, i.e., 10 parts per million of phosphorus, may be included in the wax 17 for nourishment of the plant to be grown from seed 16. This phosphorus trace may be added by mixing 50 parts of "0-20-0" superphosphate (20 percent phosphorus) with 1 million parts of "wax" vehicle 17.

Specifically, the above described "wax"-like vehicle 17 used in the practice of the invention must be water soluble; the vehicle 17 must be meltable at the comparatively low temperature of approximately 125°F, above which temperature seed is ordinarily ruined, and remain flowable in paste-like, semi-solid form for injection under pressure at an even lower temperature of approximately 118°F which temperature is non-deleterious to the life and growing characteristics of the seed 16 to be encapsulated thereby; the vehicle 17 must be quickly chillable to stable form, i.e., it must have a comparatively high "set" (non-free flow) point which enables the warm "working," paste-like "wax" to be exposed for minimal times to the seed 16, and which assures that the set or gelled "wax" will be solidly stable (non-running or non-freely flowable) at normal environmental temperatures of less than approximately 125°F for storage, shipping, and display; the vehicle 17 must be freely flowable at temperatures of 125°F and above to provide a "built-in" indicator of possibly damaged seeds (i.e., if a completed marker 10 is exposed to greater than 125°F temperature the seed 16 will most likely be killed or at least deleteriously affected, however the wax 17 will have melted and "run" to give a visual indication of the probable failure of the seed 16 to germinate); the vehicle 17 must be chemically, non-deleterious to the seed 16 and, to that end, it has been determined that the "wax" must be totally free of contamination by even trace amounts of paraffin wax, mineral oil or the like, (as described hereinafter, the apparatus of the invention should be lubricated with lubricants which are non-deleterious in terms of seed-contamination to the wax vehicle 17). Solid polyethylene glycol of the type readily commercially available from Union Carbide Co. under the registered trademark "Carbowax" is a highly advantageous material for use in practicing the invention. A solid, high molecular weight blend of "Carbowax" materials having a melting point of approximately 125°F and being maintainable at a pastelike consistency at approximately 118°F has been used as the wax 17 to successfully produce the self-starting markers 10 of the invention, in which many different seed varieties were encapsulated. Hardy, flourishing plants were grown from the following varieties of seed encapsulated in the above-described "Carbowax" blend:

| Radish | Celosia | Oregano | Lettuce |
| Tomato | Bachelors Button | Zinnia | Egg Plant |
| Carrot | Candied Tuft | Astor | Mimosa |
| Chives | Geranium | Marigold | Browahlia |
| Basil | Straw Flower | Coleus | Hypoestes |
| Cress | Salvia | Stocks | Onion |
| Alyssum | Parsley | Phlox | Ageratum |
| Balsam | Caraway | Fennel | Shasta Daisy |
| Sage | Summer Savory | Mustard | Sweet William |
| Chicory | Dill | Pepper | |

More specifically, the "Carbowax" solids and liquids employed in the practice of the invention have been long used by the pharmaceutical and cosmetics industries, among others. "Carbowax" Polyethylene Glycols are polymers of ethylene oxide with the generalized formula $HOCH_2(CH_2OCH_2)_nCH_2OH$, $n$ representing the average number of oxyethylene groups. "Carbowax" Polyethylene Glycols 200, 300, 400, and 600 are clear, viscous liquids at room temperature. They are characterized by a number of ether linkages and by two terminal hydroxyl groups. "Carbowax Polyethylene Glycols 1,000, 1,500, 1,540, 4,000 and 6,000" are white, waxy solids.

The physical properties of "Carbowax" polyethylene glycols are tabulated in the following TABLES I–III.

TABLE III

| | Heat of Combustion at 25°C., B.t.u./lb. | Vapor Pressure at 100°C., mm. Hg | Flash Point, °F.[d] |
|---|---|---|---|
| CARBOWAX Polyethylene Glycols 200 | 10,180 | | 340 |
| 300 | 10,830 | 2.9×10⁻³ [g] | 385 |
| 400 | 11,060 | 9.0×10⁻⁵ [h] | 435 |
| 600 | 11,130 | 5.2×10⁻⁶ [h] | 475 |
| 1000 | 11,250 | 3.3×10⁻⁹ [g] | 510 |
| 1500[m] | 11,090 | | 430 |
| 1540 | 11,320 | 2.0×10⁻¹² [g] | 510 |
| 4000 | 11,350 | [i] | 515 |
| 6000 | 11,390 | [i] | 520 |

FOOTNOTES:
[a] Sets to glass below −65°C.
[b] At 30 to 60°C.
[c] Mid-point of freezing range to 100°C.
[d] All flash points were determined by ASTM method D 92 using Cleveland open cup.
[e] Density, g. per ml. at 20°C.
[g] From plot of vapor pressure vs. square root of molecular weight.
[h] Experimental.
[i] Less than 2.0 × 10⁻¹² mm.
[j] Approximate.
[m] Solid at 25°C.
[n] A 50/50 mixture of PEG 300 and 1540.

TABLE I

| | Molecular Weight Range | Apparent Specific Gravity at 20/20°C. | Melting or Freezing Range,°C. | Solubility In Water at 20°C., % by wt. | Viscosity at 210°F., centistokes | Ethoxyl Content, moles |
|---|---|---|---|---|---|---|
| CARBOWAX Polyethylene Glycols 200 | 190–210 | 1.1266 | [a] | Complete | 4.3 | 1 to 10 |
| 300 | 285–315 | 1.125 | −15 to −8 | Complete | 5.8 | 2 to 14 |
| 400 | 380–420 | 1.1281 | 4 to 8 | Complete | 7.3 | 3 to 17 |
| 600 | 570–630 | 1.1279 | 20 to 25 | Complete | 10.5 | 6 to 23 |
| 1000 | 950–1050 | 1.101 (55/20°C.) | 37 to 40 | 70[j] | 17.4 | 13 to 34 |
| 1500[m] | 500–600 | 1.151[f] | 38 to 41 | 73 | 13 to 18 | [n] |
| 1540 1300–1600 | 1.0910 | 43 to 46 | 70 | 25 to 32 | 22 to 48 | |
| 4000 | 3000–3700 | 1.204[f] | 53 to 56 | 62 | 75 to 85 | 72 to 111 |
| 6000 | 6000–7500 | | 60 to 63 | 50[j] | 700 to 900 | 115 to 159 |

TABLE II

| | Comparative Hygroscopicity (Glycerine=100) | Surface Tension at 25°C., dynes/cm. | Refractive Index, $n_D^{20}$ | Average Liquid Specific Heat, cal./g./°C. | Heat of Fusion, cal./g. |
|---|---|---|---|---|---|
| CARBOWAX Polyethylene Glycols 200 | 90 | 44.5 | 1.459 | | |
| 300 | 70 | 44.5 | 1.463 | | 37 |
| 400 | 60 | 44.5 | 1.465 | 0.49[b] | 36 |
| 600 | 50 | 44.5 | 1.467 | | 35 |
| 1000 | 35 | [m] | [m] | 0.54[c] | 37 |
| 1500[m] | 35 | [m] | [m] | 0.54[c] | 37 |
| 1540 | 30 | [m] | [m] | 0.54[c] | 37 |
| 4000 | | [m] | [m] | 0.55[c] | 43 |
| 6000 | | [m] | [m] | 0.55[c] | 46 |

In accordance with the principles of the present invention, the markers 10 may be made in high volume by automatic or semi-automatic apparatus of the type disclosed in FIG. 2. The new machine includes an elongated beam 20 supported by spaced columns 21, 22. The beam 20 and supports 21, 22 therefor generally constitute a machine frame 23 from which, upon which, and in relation to which, the remaining elements of the machine are appropriately supported and arrayed, as will be described in more detail hereinafter.

The surfaces of the beam 20 are contoured by machining or otherwise to define a shallow U-shaped channel, having side rails 24 and a longitudinal horizontal support surface 25 or platen along which the individual plant markers 10 will be advanced during manufacture of the markers. The spacing of the side rails 24 may, of course, be adjusted to accommodate markers of various lengths. As will be understood, the longitudinal axes of the markers are transversely arrayed with respect to the direction of travel through the new apparatus.

Supported at one end of the machine frame 23 is an air operated feed cylinder 30, having a reciprocating feed piston 31 which carries a slide 32 at the forward end thereof. The slide 32 rides along the platen surface 25 and is adapted to contact the lowermost marker 10 in a vertical stack of marker blands 33 supported in an appropriately shaped magazine 34. The marker blanks 33 are conventional wooden markers, that is plain, pointed, flat wooden sticks. As shown in FIG. 2, the marker magazine 34 is vertically disposed above the working surface 25 of the machine and has an open bottom 35, through which a single marker at a time may be fed forwardly out of the magazine and toward the opposite end of the machine, thereby establishing a row of edge-to-edge markers. This general type of unitary, sequential feeding of flat blanks is well known and need not be described further.

The stroke of the piston 31 is adjustable to equal the width of each marker blank 33; accordingly, each reciprocation of the piston 31 will represent a single step advance of the row of blanks. As shown in FIG. 2, the blanks 33 are advanced step-by-step through the machine while aligned with their longitudinal axes transverse to the longitudinal axis of the machine and with the longitudinal edges of adjacent markers in edge-to-edge contact.

On the machine frame and downstream of the magazine 34, a punch press having a reciprocating ram 40 driven by a variable speed electric motor 41, mounts a hole forming die 42 and a branding iron 43 appropriately lettered to burn the required information 15 and index line onto the faces 13 of each of the blanks 33. The branding iron is electrically heated to a "red hot" condition and generates a substantial amount of heat which, as will be understood, might be deleterious to the operation of other moving parts of the new machine. To the end of dissipating and localizing this heat, appropriate cooling coils 44 which are part of a closed cooling loop, are arrayed about the branding iron block for the purposes of heat transfer, as will be appreciated. A coolant is continuously circulated through the coils 44, in known fashion.

Since the branding iron glows when heated and, thus, radiates heat to the surrounding portions of the new apparatus, a radiation shield 45 is mounted downstream of the reciprocating punch press ram to prevent undue heating of the advancing marker blanks and the downstream elements of the machine, to be described hereinafter.

Beyond the radiation shield 45 is a lubricating nozzle 51, through which small amounts of lubricating oil, specifically an oil which is not deleterious to the seeds 16, advantageously a low viscosity liquid "Carbowax" of the type described hereinabove, to be subsequently placed in the plant markers, are sprayed into the holes 12 in the advancing blanks. The oil lubricates the rear surfaces of the plant marker as well as the platen surface 25 along which the markers are conveyed in step-by-step fashion. Lubrication of bearings or other machine elements in the new apparatus requiring a more viscous lubricant is advantageously effected with a blend of heavy molecular weight "Carbowax" and light molecular weight "Carbowax" materials in order to prohibit the contamination of the wax 17 by even a trace of "conventional" mineral oil or silicone lubricant. Downstream of the lubricating station 50 is a motor driven blower 60 which delivers a steady stream of cooling air to the surfaces of the markers to remove any residual excess heat remaining therein.

In accordance with the invention, the next downstream station is a wax injection nozzle 70 which projects from a closed cylindrical wax storage tank 71, heated by appropriate electric heating coils 72 circumscribing the exterior walls. Additional heating coils 73 substantially envelop the nozzle 70 to control its temperature precisely for adequate and proper flow of the homogeneous wax seed mixture 18 into the plant marker blanks as they pass beneath the nozzle 70. The tank 71 is adjustably supported above the beam 20 for "brush contact" with blanks 33 by a cantilever bar 74 and spring 75 in a manner whereby the nozzle 70 very lightly bears or rides upon the upper surfaces of the row of marker blanks as they pass beneath the wax tank 71. A piston plunger 79 is appropriately air loaded through an air line 76 regulated by a controllable pressure valve 77 to force the molten wax mixture 18, (advantageously heated to and maintained at a working temperature of approximately 118°F), through the nozzle 70 at a predetermined desired rate. An index marker 78 carried by the piston rod is useful for indicating the quantity of seed-wax mix remaining in the cylindrical wax tank 71, as will be understood.

In accordance with the principles of the invention, the wax-seed mixture 18 is metered into each of the holes 12 of the plant marker 10 as it passes beneath the open orifice of the nozzle 70. The nozzle orifice is slightly larger than the diameter of the holes 12 and is located on the machine bed 23 in a position to register with the holes 12 as they are indexed beneath the tank 71. When a marker is paused with its hole 12 in registry with the orifice of the nozzle 70 beneath the tank 71, the molten wax-seed mixture will be forced under the pressure of the piston 79 through the nozzle 70 into the aperture 12 to fill it with the wax-seed mixture. When he marker blank is advanced beyond the nozzle 70 to move the hole 12 out of registry with the nozzle 70, the wooden portions of the row of plant markers will function as a valve to halt the flow of the molten wax-seed mixture 18 by virtue of the light pressure contact of the nozzle 70 against the surfaces of the row of marker blanks. When the next blank is advanced into position beneath the nozzle 70, it will have an opposite valving action to "open" the nozzle 70 to permit the deposit of the wax-seed mixture therein. Of course, the viscosity of the wax and the pressure of the plunger 79 will be controlled and will be coordinated with the machine rate to ensure precise filling of the holes 12.

In accordance with the principles of the invention, a chilling coil 80, part of a closed refrigerant loop, is disposed in contact with the underside of the platen 25 in the area beneath and beyond the nozzle 70. Thus, when the coolant is circulated through the cooling coil 80, the surface 25 and the blanks 33 in immediate contact therewith will be sufficiently chilled to set or to gel or freeze the wax-seed mixture 18 as it leaves the wax injection station and proceeds downstream of the machine. The chilled wax forms the plug 18' which will be precisely conformed to the exact inner surface contours of the hole 12 and will therefore be securely retained in the hole 12.

After the plant markers have been loaded with the seedwax mix, they are conveyed in step-by-step fashion to the end of the beam 20 where they are delivered to an exit chute 90 by a reciprocating air cylinder which redirects the finished markers in a delivery direction beneath the beam 20. The completed markers are self-stacked face-to-face in the exit chute 90 against a slideable guide 92 for subsequent removal, packaging, and shipment.

As an important aspect of the invention, the feeding of individual blanks 33 in a step-by-step manner through the new apparatus and the rate of manufacture of finished markers is simply controlled by regulating the speed of the electric motor 41 which reciprocates the punch press ram 40. Control of the air cylinder 30 is directly effected through a microswitch 100 which is actuated by an arm 101 carried by the reciprocating ram 40 for periodic cooperation with the switch 100, as will be understood. The microswitch 100 controls an electro-pneumatic valve 102 which actuates the air cylinder 30 to advance the piston 31 to the right (as shown in FIG. 2). When the microswitch 100 is deenergized, the valve 102 allows air to escape from the cylinder 30, thereby allowing piston 31 to be retracted (moved to the left as shown in FIG. 2) by virtue of springs disposed internally in the cylinder 30. As will be understood, when the punch press ram 40 is raised (energizing the switch 100), the air will flow into the air cylinder 30 through valve 102 causing piston 31 to feed an individual marker from the bottom of the stack 33. When the ram 40 descends (de-energizing switch 100) it will cause the branding of the marker beneath the branding iron 43 and the forming of a hole in the marker beneath the die 42. With switch 100 de-energized, the feeding mechanism 32 will be withdrawn and will be in an inactive position, as will be understood.

As an important aspect of the invention, the air cylinder 30 is lubricated by "Carbowax" oil which is stored in an oil reservoir 103, supported adjacent the valve 102. A small amount of oil is drawn into and expelled from the cylinder 30 during each complete cycle thereof. The expelled oil is blown through tubing 104 to the lubrication station 50 where it is sprayed through the nozzle 51 onto and through the blanks, as explained hereinabove. In addition, some of the air leaving the cylinder 30 travels through air line 105 and to a fixture 106 which blows the hole-forming slugs of wood, formed by die 42, away from the machine bed. As shown, an air line 107 also extends from the valve 102 to the ejection cylinder 91 at the end of the machine. It will be understood that other mechanical drives may be used in lieu of the air cylinders described herein.

In accordance with a specific aspect of the invention, the hole-forming die 42, as shown in FIG. 3, is specially contoured to form the holes 12 cleanly and accurately, without splintering the sticks. This is effected by forming the die with two rounded, sharpened, tooth-like extensions 42a which are adapted to shear the wood across the grain while having a sharpened, U-shaped concavity 42b between those tooth-like projections, which is arranged to cut or chop with the grain 11 of the individual markers. The use of a die of this configuration enables rapid and clean "punching" of the holes 12.

In an alternative preferred embodiment of the invention, the seeds 16 are not pre-mixed with the water soluble wax 17 for injection as a homogeneous mixture to the hole 12. In this case, the seeds 16 are placed in the aperture 12 independently and ahead of the wax injection. Thereafter, the wax is injected to envelop and to hold the seeds in the hole by formation of the plug. When this alternative method of forming markers is employed, a separate seed loader 110 is disposed on the machine upstream of the wax pot 71. Such a seed loader may comprise a funnel-like seed storage chamber 111 which is supported above a horizontally reciprocating plate 112, having a perforation therein. The perforation is adapted to register alternately with the spout 113 of the funnel 111 and a delivery tube 114, which itself is adapted to register with the holes 12 of the plant marker blanks 33 passing thereunder. As will be understood, the slide 112 is reciprocate in accordance with the timed, step-by-step advance of the markers 10 along the machine bed 23 to carry a predetermined number of seeds (the number being determined by the size of the perforation in the slide) from the seed chamber 111 to the delivery tube 114. In this embodiment, the seeds 16 will be deposited in the hole 12 as the blank passes beneath the station 100. Thereafter, the seeds will be advanced to the wax injection station or nozzle 70 where they will be protected, covered, and enveloped by the injection of the plain wax 17, in the manner described hereinabove.

Briefly reviewing the operation of the methods and apparatus of the present invention, a vertical stack of conventional wooden plant markers is initially placed in the magazine 34. Thereafter, the ram 40 of the punch press is reciprocated at a speed determined by the speed of an electric motor 41. On each down stroke of the ram 40, microswitch 100 will be de-energized to release air from the cylinder 30 to allow the piston 31 to retract to the left under the bias of internal springs. At the bottom of the down stroke, the marker which is beneath the branding iron 43 will be branded with the information as to the seed to be carried by the marker 10, the index line 14 and the planting instructions 15, while the marker beneath the die 42 will have the hole 12 formed therein by the die 42. The marker beneath the nozzle 70 of the cylindrical wax tank 71 will have wax or a wax-seed mix injected into the hole 12 thereof. When the ram 40 ascends, the microswitch 100 will be energized, allowing air from the valve 102 to advance the piston 31 in the feed direction to feed a new blank from the bottom of the stack onto the machine platen and to advance or to index the entire row of marker blanks one step, the width of one marker.

During the actuation of the air cylinder 30, the cylinder 91 at the opposite end of the machine will feed the endmost marker in the row downwardly into the exit chute 90. During the cycling of the ram 40 and the air cylinder 30, when air is expelled from the cylinder through valve 102, lubricating oil is sprayed at station 50 through the hole 12 of the marker onto the surface 25.

It will be appreciated that the handling of the seeds and the formation of the transparent or translucent seed carrying discs 18 of chilled wax requires precision control of the temperatures of many different elements. To that end, the machine as shown includes two separate cooling loops, a first loop including a coolant coil 44 for directly cooling the branding iron shoe to protect the adjacent elements of the machine and a second loop including a cooling coil 80 to chill the platen 25 in order to gel the molten wax after it has been injected into the marker. In addition, induction heating coils are required for maintaining the molten wax 17 or wax-seed mixture 18 at the requisite temperature to maintain a desired viscosity for a particular application. Similarly, a heating coil is necessary (not shown) to elevate the temperature of the branding iron 43 to effect burning or branding of the wooden markers. The heat generated by the branding iron, of course, must be dissipated as well as prevented from interfering with the operation of the remainder of the machine, and, to that end, in addition to the cooling coils 44, an appropriate radiation shield 45 and blower 60 are included in the new and improved apparatus.

It is to be understood that the specific illustrated embodiments of the method, apparatus, and product herein described are intended to be representative only, as certain changes may be made therein without departing from the clear teachings of the disclosure. For example, the method and apparatus for loading and securing seeds may be employed with "markers," other than wooden ones, including plastic, paperboard or like materials in forms other than "sticks." Accordingly, reference should be made to the following appended claims in determining the full scope of the invention.

I claim:

1. A method of manufacturing self-starting plant markers comprising the steps of:
   a. supplying a series of wooden sticks;
   b. branding said sticks to provide index means thereon;
   c. forming an aperture in each of said sticks;
   d. depositing at least one seed in said aperture;
   e. maintaining a flowable supply of water soluble vehicle means at a temperature less than 125°F;
   f. injecting said flowable vehicle means into said aperture to fill the same; and
   g. chilling said vehicle means to a solid, non-flowable state, thereby securing said seed within said aperture.

2. The method of claim 1, in which
   a. planting information, seed species identification, and a soil level line are concurrently applied to said sticks during said branding step.

3. The method of claim 1, in which
   a. said seed depositing step and said vehicle injecting step are effected simultaneously by injecting a mixture of seed and vehicle means into said aperture.

4. The method of claim 1, further characterized in that
   a. a lubricating oil is applied to said sticks to prevent undue adhesion of the same to one another and to facilitate sliding advance of said sticks during the processing of the same.

5. The method of claim 1, in which
   a. said oil is a polyethylene glycol fluid and is sprayed toward apertures formed in said sticks; and
   b. said vehicle is a polyethylene glycol wax-like substance.

6. A method of loading a seed carying unit, comprising
   a. supplying a seed carrying member;
   b. establishing a flowable, uniform mixture of seed and water soluble vehicle means having a predetermined concentration of seed per unit volume of vehicle means;
   c. injecting a predetermined amount of said mixture upon said carrying member;
   d. chilling said injected mixture to a solid state, thereby forming a seed carrying unit comprised of said carrying member and seeds adhered thereto by a chilled vehicle.

7. The method of claim 6, in which
   a. said seed carrying member is an apertured element;
   b. said vehicle means is a wax-like, polyethylene glycol compound.

8. The method of claim 6, in which
   a. said mixture is formed in situ upon said seed carrying member by sequentially applying seed and vehicle means thereto.

9. Apparatus for manufacturing self-starting plant markers comprising
   a. means for supplying a series of wooden sticks;
   b. means for branding said sticks to provide index means thereon;
   c. means for forming an aperture in said sticks;
   d. means for depositing at least one seed in said aperture;
   e. means for maintaining a water soluble vehicle means at a temperature less than 125°F and in a flowable state;
   f. means for injecting said water soluble vehicle means into said aperture; and
   g. means for chilling said vehicle means to a substantially solid state thereby securing said seed within said aperture.

10. Apparatus for manufacturing plant markers in accordance with claim 9, in which
    a. said supplying means includes a magazine means disposed adjacent a platen means and a cooperating, reciprocating feed arm adapted to withdraw a marker blank from said magazine and advance the same along said platen in a step-by-step manner;
    b. said means for branding and means for forming an aperture include a branding iron and hole forming die carried upon a vertically reciprocating punch press ram;
    c. said means for injecting said water soluble vehicle means including a heated tank with a nozzle projecting therefrom, said nozzle adapted to be valved by sliding contact with marker blanks passing thereunder.

11. The apparatus of claim 10, in which
    a. said chilling means includes a coil in contact with said platen means through which coil a refrigerant is circulated.

12. The apparatus of claim 10, in which
    a. timing means coordinate the reciprocation of said feed arm and said punch press ram in a manner whereby said ram descends during a pause in the feed and advance of marker blanks and said blanks are advanced during the ascent of said ram.

* * * * *